United States Patent Office 3,107,798
Patented Oct. 22, 1963

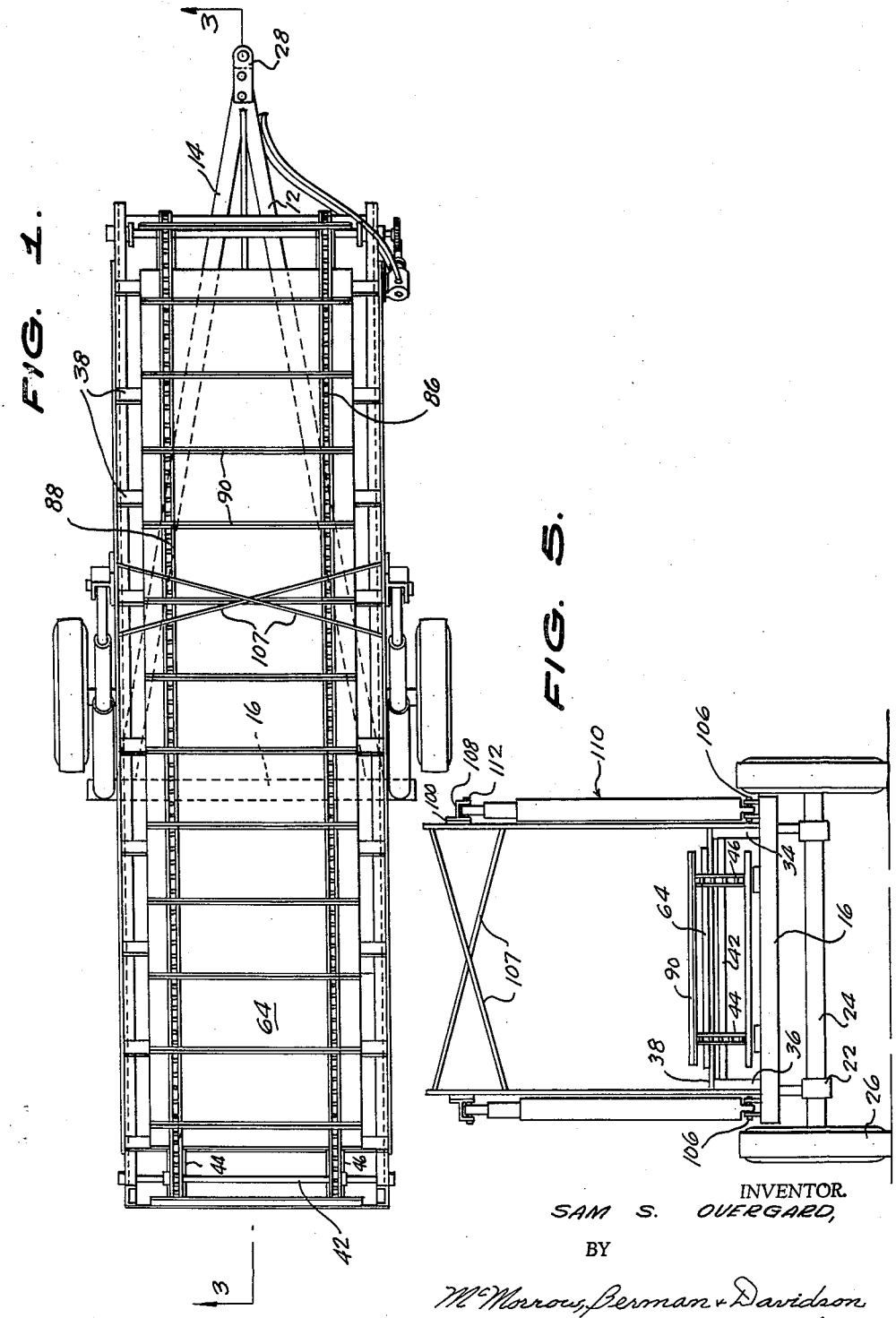

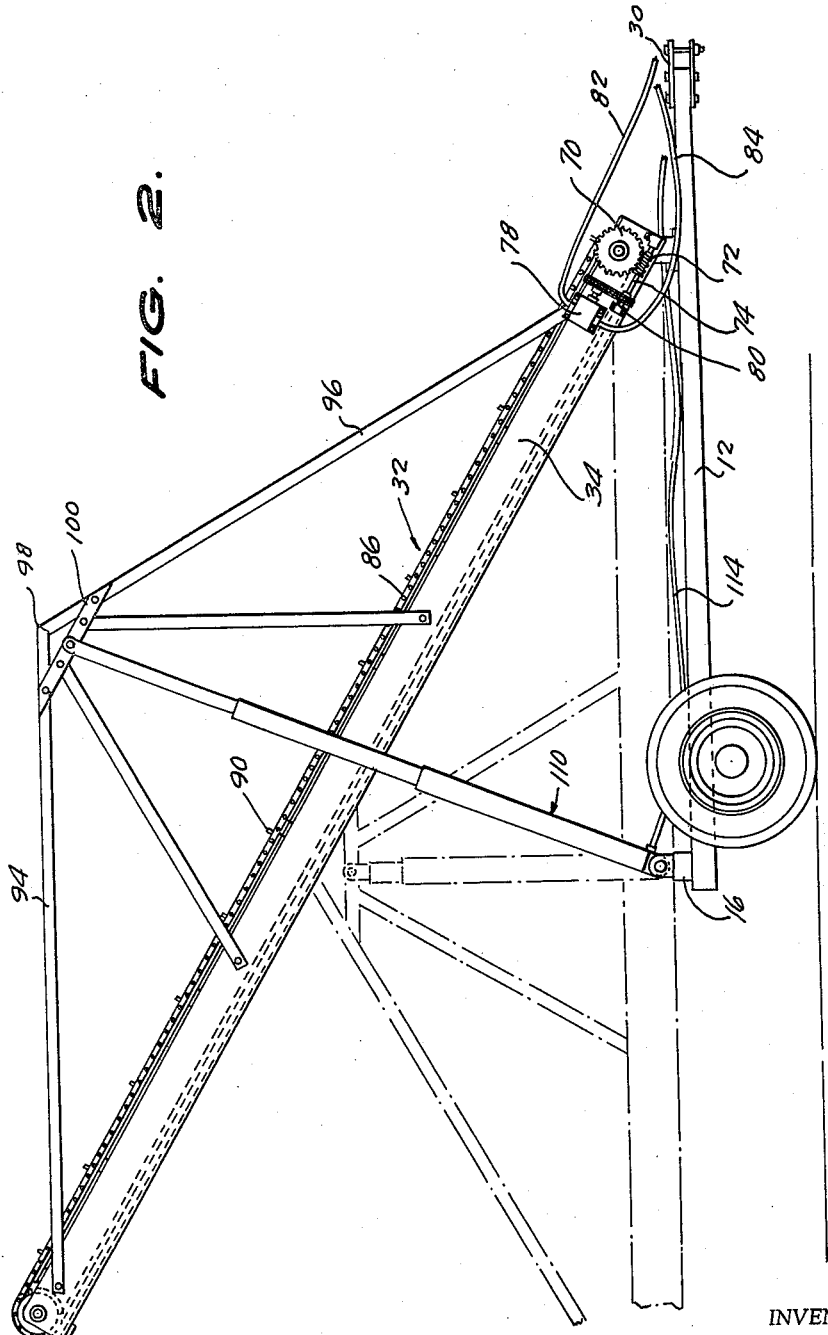

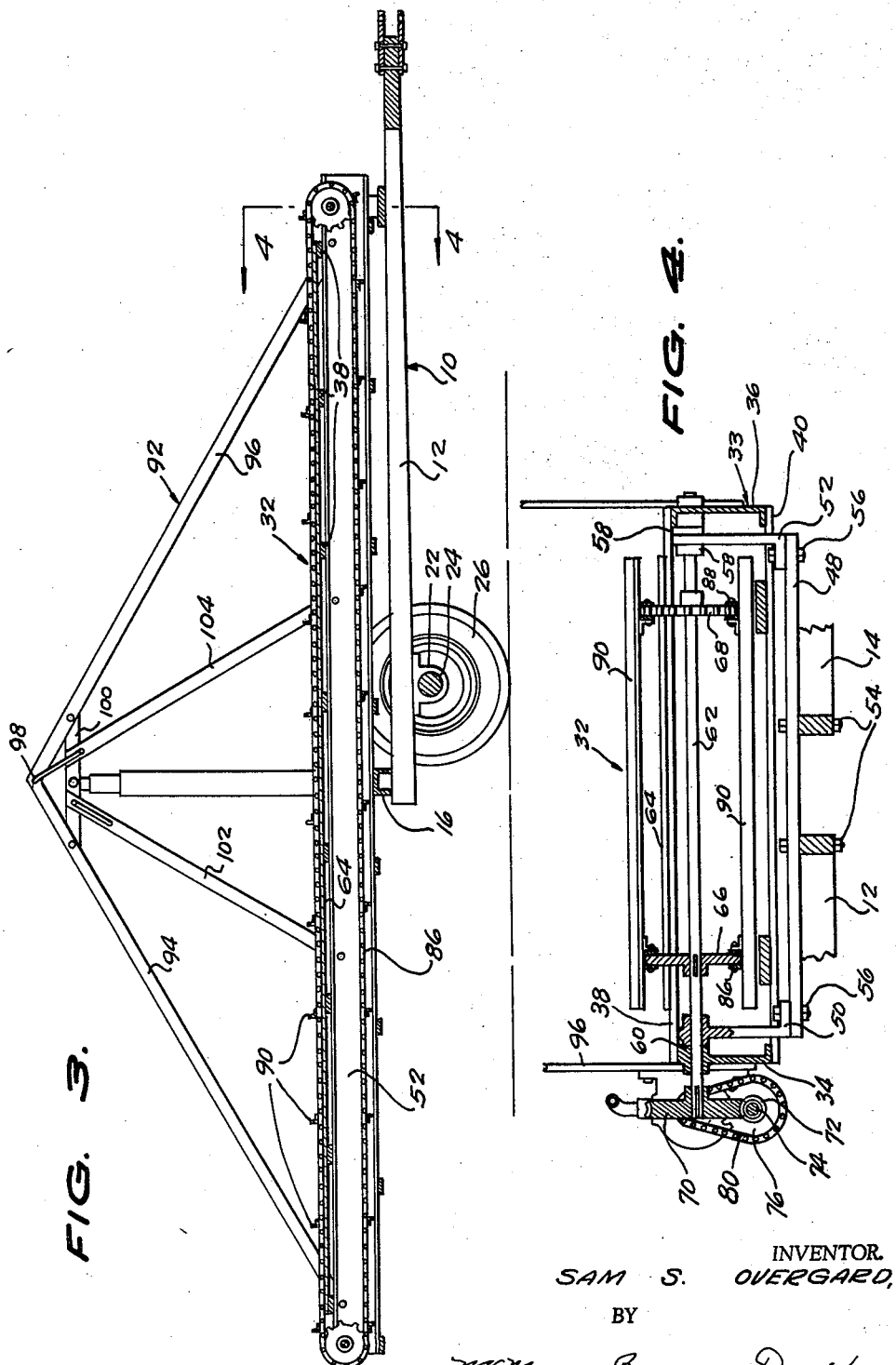

3,107,798
VEHICLE WITH MATERIAL HANDLING MEANS
Sam S. Overgard, Huson, Mont.
Filed July 6, 1962, Ser. No. 208,048
1 Claim. (Cl. 214—83.26)

This invention relates to a vehicle having material handling means, and more specifically, to a trailer having load handling means and means for discharging its load at a selected height above the frame thereof.

An object of the invention is the provision of an improved device of the character described above which is particularly adaptable for use as an agricultural appliance. The invention contemplates the handling of items such as baled hay, and the like, by means which materially reduce the manual handling thereof now necessary in gathering, transporting, and storage of such items.

Another object of the invention is the provision of non-manual load shifting means in a trailer whereby materials may be placed in the trailer at a fixed location and thereafter transferred in sequence to other locations until the trailer is fully loaded.

A still further objective is to provide an unloading trailer having means for positioning the discharge end portion thereof at selected heights whereby materials may be conveniently arranged in successive layers with a minimum of handling.

Other and further objects and advantages of the invention will become apparent from a consideration of the following specification when read in conjunction with the annexed drawings in which:

FIGURE 1 is a top plan view of a materials handling vehicle constructed and assembled in accordance with the teachings of this invention;

FIGURE 2 is an enlarged side elevational view thereof, showing optional positions of the load carrying and conveyor assembly thereof in full and phantom lines;

FIGURE 3 is a cross-sectional view taken substantially on the section line 3—3 of FIGURE 1, looking in the direction of the arrows;

FIGURE 4 is an enlarged, detailed cross-sectional view, taken along the section line 4—4 of FIGURE 3, looking in the direction of the arrows; and FIGURE 5 is a rear end elevational view, the conveyor and load carrying assembly being shown in an extreme depressed location.

In the drawings, it is seen that the device comprises a trailer-type vehicle which includes an open, generally triangular supporting frame 10 having side members 12 and 14 and a rear end cross member 16. Axle bearings 22 depend from the side frames 12 and 14 adjacent the rear cross member 16, and a cross axle 24 with suitable ground wheels 26 is carried thereby. As best seen in FIGURE 1, the side members 12 and 14 merge to an apex portion 28 at their forward ends, and hitch means 30 for connection to a prime mover (not shown) such as a tractor, is provided.

A load carrying and conveyor assembly 32 is supported on the frame 10 and comprises a framework 33 having a pair of spaced apart, generally rectangular side elements 34, 36 of channel shaped section, and having suitable reinforcing upper and lower cross elements 38, 40 extending therebetween at selected, spaced intervals, whereby there is provided the open, rectangular box-like framework 33. An elongated, transverse idler axle member 42 is mounted adjacent the rear or outer end of the framework and carries freely rotatable idler sprockets 44 and 46.

Pivot means for mounting the framework 33 to the frame 10 comprises an elognated transverse front cross member 48 to the outer ends of which are affixed a pair of upstanding, substantially L-shaped brackets 50 and 52. The cross member 48 is secured to the frame members 12 and 14 by bolts 54, and the brackets are secured in position by bolts 56, or the like. The upper ends of the brackets 50, 52 each have an integral axle bearing 58 arranged in axial alignment with bearing means 60 formed in the side elements 34, 36, and a transverse drive axle 62 is journaled therethrough thereby to pivot the forward end of the assembly 32 to the frame 10. In the location shown in phantom lines in FIGURE 2, the assembly 32 is thus supported by the drive axle 62 at its forward end, and rests on the rear end cross member 16 of the frame 10 at its other end.

Fixed to the upper cross members 38 of the framework 33 is an elongated, flat bed 64, formed of any suitable material, which comprises the load support element of the assembly 32. It will be noted that the bed 64 does not extend the full length of the framework 33, but is spaced inwardly from the ends thereof to accommodate the involved sprockets.

The drive axle 62 has keyed thereto a pair of transversely spaced drive sprockets 66, 68, longitudinally aligned with the sprockets 44 and 46, and is connected at one side to a drive gear wheel 70. The gear wheel 70 is in mesh with a worm gear 72 having a shaft 74 connected to a second gear wheel 76. A reversible fluid motor 78 of conventional construction and assembly is mounted on the side element 34 and connected through a chain drive 80 to the second gear wheel 76. Fluid supply and relief hose 82, 84 connected to a source of the prime mover, supply the fluid motor and control the operation thereof. As will be seen from the foregoing, the operator of the prime mover controls the rotation of the drive axle 62 and sprockets 66 and 68 carried thereby by means of actuation of the fluid motor 78.

A pair of elongated link chains 86 and 88 are trained about the drive sprockets 66, 46 and 68, 44, respectively. At selected intervals, these chains are supplied with cross members or conveying bars 90 constituting conveying means movable across the fixed load support bed 64. By this means, a load placed on the bed at any location can be shifted by the operator to any other desired position on the bed, or discharged over the rear or discharge end of the device. If the vehicle is used in conjunction with a baler or the like having a fixed discharge position, the materials discharged on the bed 64 at said fixed position may be successively conveyed until the vehicle is fully loaded.

Means for raising the assembly 32 about the pivot of the drive axle 62 is provided, and includes an overhead brace or lift frame assembly 92 on each side thereof. The assemblies 92 each include a pair of braces 94, 96 angled upwardly from the framework and meeting at an apex 98 centrally of the framework and secured to the respective side elements thereof. Adjacent the apex 98, the braces 94, 96 are supplied with a normally horizontal cross brace 100 extending therebetween and fixed thereto by bolts, rivets, or the like, and additional upright braces 102, 104 further connect the horizontal brace 100 to the respective side elements of the framework. Cross braces 107 interconnect the opposite sides of the lift frames and further rigidify the assembly.

A pair of upstanding, apertured ears constituting a clevis 106 are fixedly secured to each of the outer ends of the rear cross member 16. Fixed to the outer side of each of the horizontal braces 100 is a U-shaped element 108 constituting a second clevis means A pair of conventional hydraulic jacks 110 are used for lifting the assembly 32 and are mounted between the respective clevis means on each side of the frame. The jacks 110 include ring connections at each end whereby bolts 112 passed through the clevises and the rings serve to pivotally mount the jacks, and fluid supply means 114 extend to a power and control source on the prime mover. Thus, the rear or unloading end of the vehicle may be elevated or depressed to any desired location within the range of extension of the jacks 110. This enables the sequential stacking of materials unloaded from the vehicle with a minimum of manual handling.

Having described and illustrated one embodiment of the invention in detail, it will be understood that this description and illustration is offered merely by way of example, and that the invention is to be limited in scope only by the appended claim.

What is claimed is:

A materials handling vehicle comprising:
(a) a generally triangular vehicle frame having hitch means at one end thereof for connection to a prime mover and having ground wheels adjacent its opposite end;
(b) a substantially rectangular, open framework including a pair of side members and upper and lower cross members, mounted above said vehicle frame;
(c) a pair of brackets extending upwardly from said vehicle frame adjacent said one end thereof;
(d) a transverse drive axle extending through said side members of said framework and pivotally secured in the bracket whereby the framework is pivotally connected to the vehicle frame adjacent said one end thereof;
(e) a bed on said framework secured to the upper cross members thereof;
(f) a transverse idler axle mounted on the other end of said framework;
(g) a pair of drive sprockets secured to the drive axle and rotatable therewith, and a pair of idler sprockets on the idler axle arranged respectively in longitudinal alignment with the drive sprockets;
(h) link chains trained about the respective drive and idler sprockets;
(i) a plurality of transverse conveying bars secured to the chains at spaced intervals and movable above said bed;
(j) a rigid lift frame, extending upwardly from each side of the framework above the bed and each lift frame including a plurality of braces, a pair of which extend upwardly and inwardly from adjacent the ends of the framework to an apex portion substantially centrally located with respect to each side;
(k) a cross brace extending between and rigidly connecting each pair of braces, respectively, adjacent the apex portions of said lift frame;
(l) a pair of elongated upright braces for each side of said framework, said last-named pairs of braces having one of their respective ends connected with said framework and their other respective ends connected to the immediately adjacent one of said cross braces, said last-named pairs of braces being located intermediate the first of said pairs of braces, respectively;
(m) the framework extending outwardly from the vehicle frame beyond said opposite end thereof a substantial distance; and
(n) a vertical, extensible and retractable lift jack pivotally connected to each cross brace, and pivotally connected to the vehicle frame adjacent said opposite end thereof.

References Cited in the file of this patent

UNITED STATES PATENTS

| | | |
|---|---|---|
| Re. 17,160 | Barber | Dec. 11, 1928 |
| 2,395,075 | Smith | Feb. 19, 1946 |
| 2,525,006 | Von Doehren | Oct. 10, 1950 |
| 2,620,934 | Smoker | Dec. 9, 1952 |
| 2,761,573 | Fulper | Sept. 4, 1956 |
| 2,776,763 | Meyer et al. | Jan. 8, 1957 |
| 2,788,139 | Tendresse | Apr. 9, 1957 |
| 2,885,209 | Bruecker | May 5, 1959 |
| 2,912,095 | Palmer et al. | Nov. 10, 1959 |
| 3,010,726 | Smoker et al. | Nov. 28, 1961 |

FOREIGN PATENTS

| | | |
|---|---|---|
| 427,876 | Germany | June 20, 1925 |